United States Patent [19]

Arai

[11] Patent Number: 5,737,658
[45] Date of Patent: Apr. 7, 1998

[54] BARRIER DEVICE FOR CAMERA

[75] Inventor: Akihiro Arai, Tokyo, Japan

[73] Assignee: Asahi Kogaku Kogyo Kabushiki Kaisha, Tokyo, Japan

[21] Appl. No.: 834,037

[22] Filed: Apr. 11, 1997

Related U.S. Application Data

[63] Continuation of Ser. No. 576,012, Dec. 21, 1995, abandoned.

[30] Foreign Application Priority Data

Dec. 22, 1994 [JP] Japan .................. 6-336561

[51] Int. Cl.$^6$ .................................................. G03B 9/26
[52] U.S. Cl. .................................................. 396/448
[58] Field of Search ............................ 396/348, 349, 396/439, 448

[56] References Cited

U.S. PATENT DOCUMENTS

| 729,364 | 5/1903 | Lee | 354/253 |
|---|---|---|---|
| 4,019,192 | 4/1977 | Miyagawa | 354/187 |
| 4,864,338 | 9/1989 | Wakabayashi | 354/187 |
| 4,876,563 | 10/1989 | Ishida et al. | 354/234.1 |
| 4,989,027 | 1/1991 | Ishii et al. | 354/253 |
| 5,051,765 | 9/1991 | Yoshizaki et al. | 354/187 |
| 5,130,730 | 7/1992 | Ishii et al. | 354/253 |
| 5,159,372 | 10/1992 | Nomura et al. | 354/253 |
| 5,276,475 | 1/1994 | Haraguchi et al. | 354/202 |

FOREIGN PATENT DOCUMENTS

| 61-89823 | 6/1986 | Japan . |
|---|---|---|
| 61-171035 | 10/1986 | Japan . |
| 62-6724 | 1/1987 | Japan . |
| 2538106 | 7/1996 | Japan . |

*Primary Examiner*—Safet Metjahic
*Assistant Examiner*—Eddie C. Lee
*Attorney, Agent, or Firm*—Greenblum & Bernstein P.L.C.

[57] ABSTRACT

A barrier device has an opening, through which a photographing lens of a camera is exposed, and first and second barrier members to open and close the opening. The first barrier member is moved along the plate to cover less than a half of the opening. The second barrier member is moved along the plate to cover the remaining part of the opening, the remaining part not being covered by the first barrier member. An operation member is provided for moving the first barrier member. A lever is rotatably supported by a support plate by which the first and second barrier members are movably supported. One end portion of the lever is connected to the first barrier member, and another end portion of the lever is connected to the second barrier member. A distance between one end portion and the pivot portion of the lever is shorter than a distance between another end portion and the pivot portion.

14 Claims, 10 Drawing Sheets

BARRIER DEVICE FOR CAMERA

This application is a continuation of application Ser. No. 08/576,012, filed Dec. 21, 1995, now abandoned.

BACKGROUND OF THE INVENTION

1. Field of the Invention

The present invention relates to a barrier device provided in a camera to cover a photographing lens of the camera.

2. Description of the Related Art

There is known a barrier device which covers a photographing lens of a camera. The barrier device has a single barrier to open and close an opening through which the photographing lens is exposed. An operation member is connected to the barrier and projected from a surface of the camera body so as to be handled by a user. Namely, by manually moving the operation member, the opening is opened and closed by the barrier.

In such a barrier device, however, a large space is needed at one side of the opening so that the barrier can be displaced outside the opening when the photographing lens is exposed. Accordingly, there is a drawback in that the barrier device is bulky and a stroke of the operation member must be long to open and close the opening.

SUMMARY OF THE INVENTION

Therefore, an object of the present invention is to provide a barrier device which is miniaturized and in which the opening is opened and closed by a stroke shorter than in a conventional device.

According to the present invention, there is provided a barrier device provided in a camera to open and close an opening through which a photographing lens of the camera is exposed, the barrier device comprising a first barrier member, a second barrier member, and transmitting means.

The first barrier member can move to cover a first part of the opening. The second barrier member can move to cover a second part of the opening. The second part is not covered by the first barrier member and is larger than the first part. The transmitting means transmits a movement of the first barrier member to the second barrier member in such a manner that a moving amount of the second barrier member is larger than that of the first barrier member.

Further, according to the present invention, there is provided a barrier device provided in a camera to open and close an opening through which a photographing lens of the camera is exposed, the barrier device comprising a first barrier member and a second barrier member.

The first barrier member has a first barrier portion for covering a first part of the opening. The second barrier member has a second barrier portion for covering a second part of the opening, and the second part is not covered by the first barrier member. The size of the second barrier portion is larger than that of the first barrier portion.

Still further, according to the present invention, there is provided a barrier device provided in a camera to open and close an opening through which a photographing lens of the camera is exposed, the barrier device comprising a first barrier member, a second barrier member, and transmitting means.

The first barrier member moves to cover a first part of the opening, the first barrier member being provided with an operation member projected from a surface of the camera. The second barrier member moves to cover a second part of the opening to close the opening in association with the first barrier member. The transmitting means transmits a movement of the first barrier member to the second barrier member in such a manner that a moving amount of the second barrier member is larger than that of the first barrier member.

Furthermore, according to the present invention, there is provided a barrier device provided in a camera to open and close an opening through which a photographing lens of the camera is exposed, the barrier device comprising, forming means forming the opening, a first barrier member, a second barrier member, means for moving the first barrier, and transmitting means.

The first barrier member can move to cover less than a half of the opening. The second barrier member can move to cover a remaining part of the opening, and the remaining part is not covered by the first barrier member. The moving means moves the first barrier member. The transmitting means transmits a movement of the first barrier member to the second barrier member in such a manner that a moving amount of the second barrier member is larger than that of the first barrier member.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
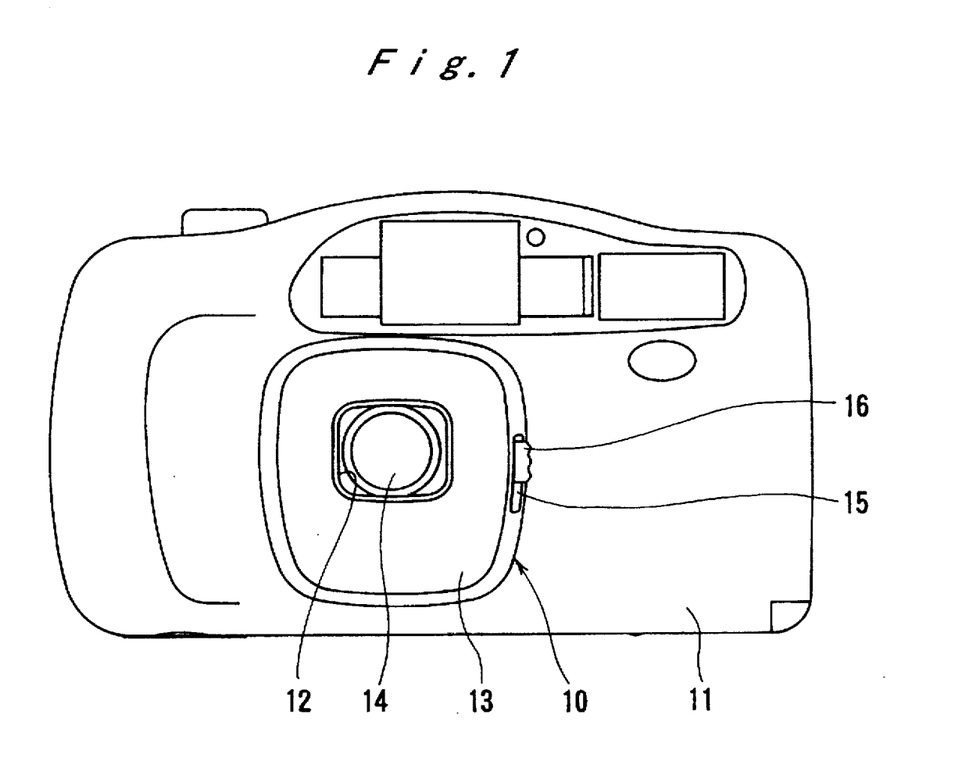
FIG. 1 is a front view showing a camera having a barrier device of an embodiment of the present invention, in which the barter is open.
Figure 2:
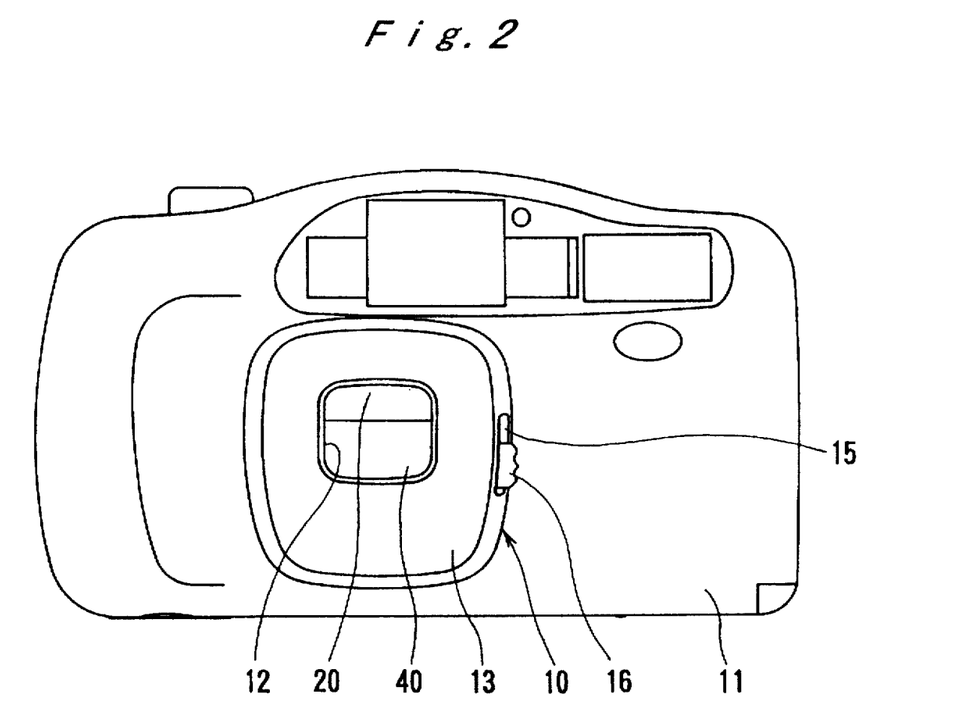
FIG. 2 is a front view showing the camera, in which the barrier is closed.

FIGS. 1 and 2 show a camera having a barrier device of an embodiment of the present invention, and show open and closed conditions of the barrier device, respectively.

A barrier device 10 is provided on a front surface of a camera body 11 to open and close an opening 12 formed in a cover portion 13, which is formed on the front surface and protrudes therefrom. The opening 12 is substantially rectangular, and a photographing lens 14 is fully exposed through the opening 12. The barrier device 10 has first and second barrier members 20 and 40 movably provided in the cover portion 13 to open and close the opening 12. The first barrier member 20 is positioned in an upper side of the opening 12, and the second barrier member 40 is positioned in a lower side of the opening 12. A slot 15 is formed in a side surface of the cover portion 13. An operation member 16 connected to the first barrier member 20 protrudes from the slot 15 to be operated by a user.

Figure 3:
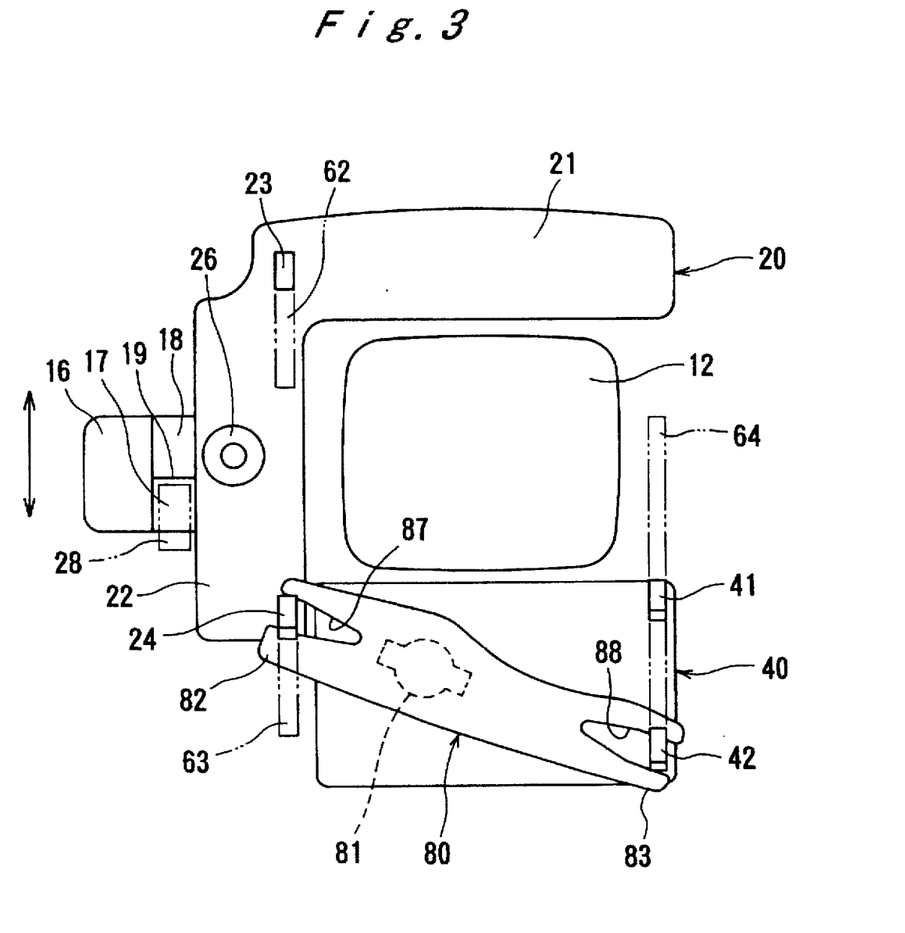
FIG. 3 is a rear view showing an open condition of the barrier device, with a cover member and a support plate removed.
Figure 4:
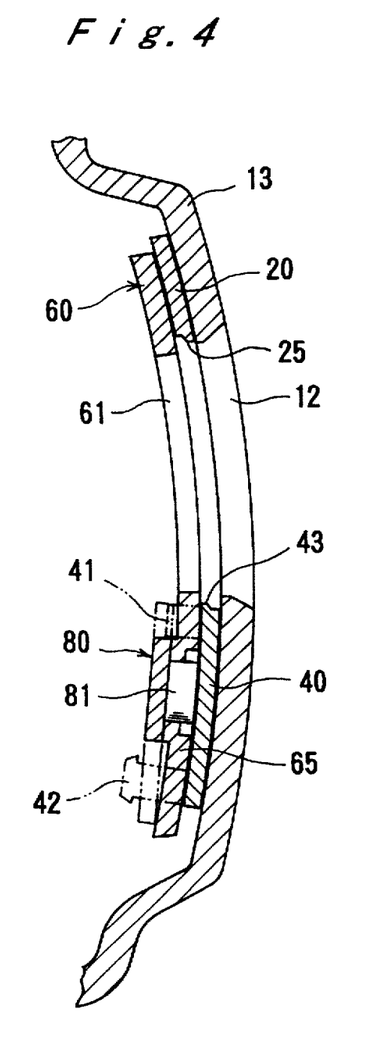
FIG. 4 is a sectional view showing the open condition shown in FIG. 3.
Figure 5:
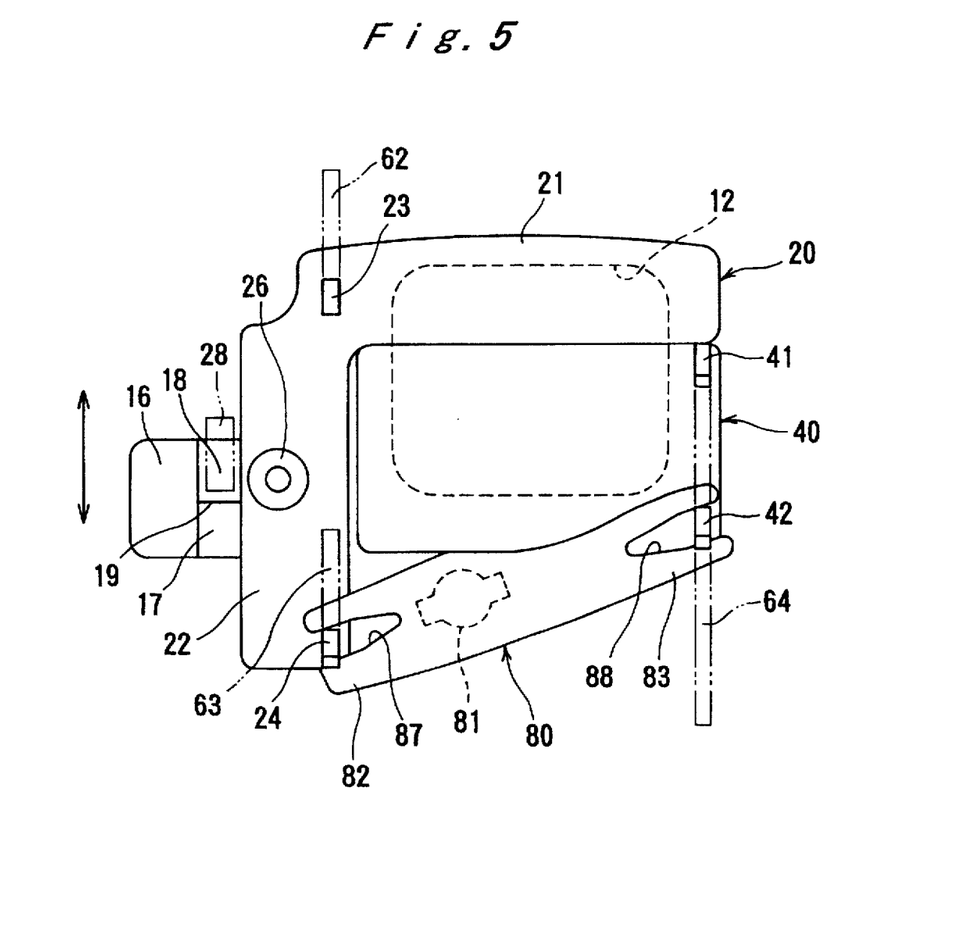
FIG. 5 is a rear view showing a closed condition of the barrier device, with the cover member and the support plate removed.
Figure 6:
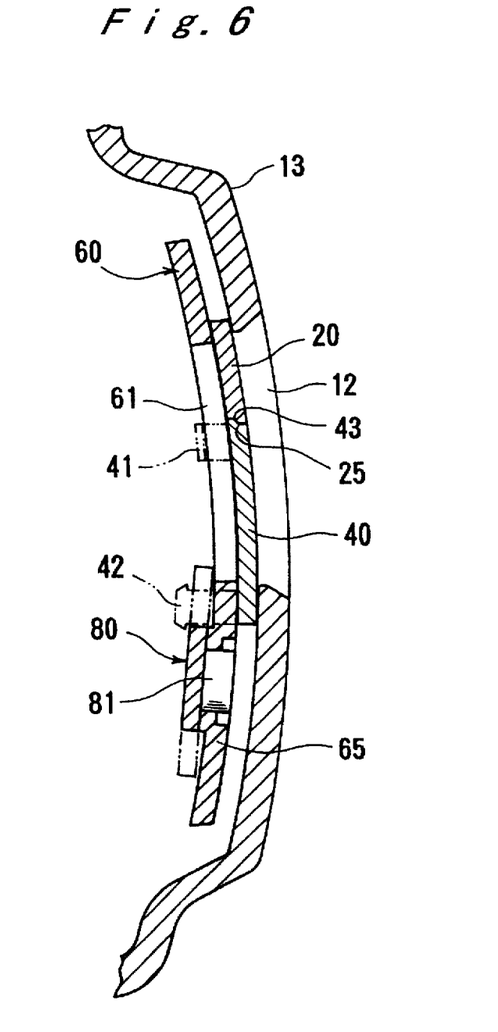
FIG. 6 is a sectional view showing the closed condition shown in FIG. 5.

FIGS. 3 and 4 show the open condition of the barrier device, and FIGS. 5 and 6 show the closed condition of the barrier device. The first and second barrier members 20 and 40 are provided behind the cover portion 13, and are sandwiched between the cover portion 13 and a support plate 60 which is connected to a rear surface of the cover portion 13. The first and second barrier members 20 and 40 are movably supported by the support plate 60. The support plate 60 has an opening 61, which has approximately the same shape as the opening 12 of the cover portion 13 and is positioned so as to be coincident with the opening 12. Each of the first and second barrier members 20 and 40 is formed by a part of cylindrical plate which is curved in an upright direction of the camera body 11, and is moved along a cylindrically curved plane corresponding to the cylindrical plate. Note that, in FIGS. 3 and 5, the cover portion 13 and the support plate 60 are omitted.

The first barrier member 20 is an approximately L-shaped plate and has a main part (or a first barrier portion) 21 and a side part 22 which are extended in directions perpendicular to each other. The main part 21 is provided for closing an upper part of the openings 12 and 61. The side part 22 is positioned outside of the openings 12 and 61. The side part 22 is provided with projections 23 and 24 which are slidably supported by guide slits 62 and 63, respectively, formed in the support plate 60, so that the first barrier member 20 can be moved along the vertical sides of the openings 12 and 61.

The second barrier member 40 is a rectangular plate or second barrier portion, and is provided for closing a lower upper part of the openings 12 and 61. The second barrier member 40 is provided with projections 41 and 42 which are slidably supported by a guide slit 64 formed in the support plate 60, so that the second barrier member 40 can be moved along the vertical sides of the openings 12 and 61. The size of the second barrier member 40 is larger than the first barrier portion 21, of the barrier member 20.

The first barrier member 20 covers less than a half of the openings 12 and 61. The second barrier member 40 covers the remaining part of the openings 12 and 61, and the remaining part is not covered by the first barrier member 20. Namely, the remaining part is larger than the part covered by the first barrier member 20, and the vertical length of the main part 21 is shorter than that of the second barrier member 40.

As understood from FIGS. 4 and 6, the main part 21 of the first barrier member 20 has a first stepped edge 25 at the lower end thereof, and the second barrier member 40 has a second stepped edge 43 at the upper end thereof. The first stepped edge 25 and the second stepped edge 43 can engage with, or can be interlocked with each other to close the openings 12 and 61. Namely, the first and second barrier members 20 and 40 are movable to an open position at which the barrier members 20 and 40 are completely recessed from the openings 12 and 61, and are movable to a closed position at which the barrier members 20 and 40 abut each other to close the openings 12 and 61. The moving direction of each of the first and second barrier members 20 and 40 is substantially perpendicular to the optical axis of the photographing lens 14.

The projection 24 of the first barrier member 20 and the projection 42 of the second barrier member 40 are connected by a lever 80. The lever 80 has a pivot pin 81 by which the lever 80 is rotatably supported by the support plate 60 at a pivot portion 65, which is positioned at a lower part of the support plate 60 as understood from FIGS. 4 and 6. One end portion of the lever 80 is a first bifurcated portion 82, which is connected to the projection 24 of the first barrier member 20. Another end portion of the lever 80 is a second bifurcated portion 83, which is connected to the projection 42 of the second barrier member 40. Therefore, when the lever 80 is rotated about an axis of the pivot pin 81, the first and second barrier members 20 and 40 are moved along the guide silts 62, 63 and 64.

In the lever 80, the distance between the pivot pin 81 and the first bifurcated portion 82 is shorter than the distance between the pivot pin 81 and the second bifurcated portion 83. Namely, the lever 80 transmits a movement of the first barrier member 20 to the second barrier member 40 in such a manner that the moving amount of the second barrier member 40 is larger than that of the first barrier member 20.

The lever 80 is positioned outside the openings 12 and 61 so that no part of the lever 80 is projected into the openings 12 and 61, regardless of the rotational position of the lever 80.

Figure 7:
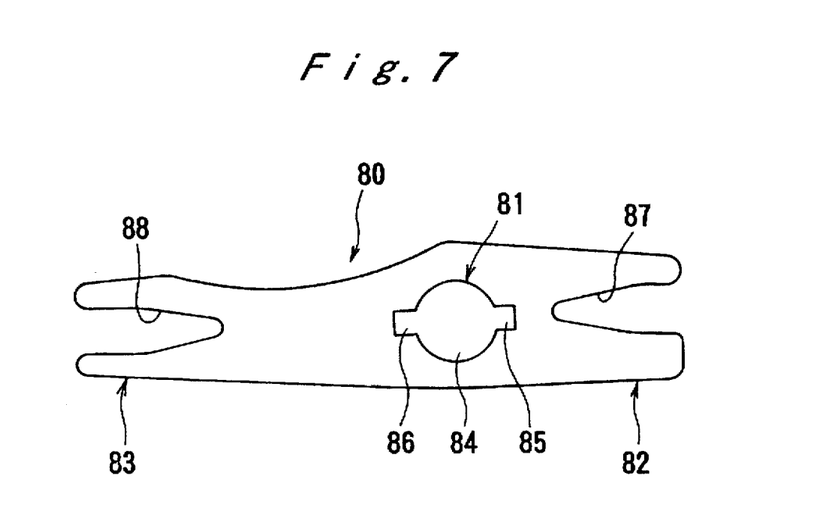
FIG. 7 is a front view showing a lever, viewed from a pivot pin.

FIG. 7 shows the lever 80, viewed from the pivot pin 81. As shown in this drawing, the pivot pin 81 has a cylindrical body 84, and a pair of tongue portions 85 and 86, which are formed on a side surface of the cylindrical body 84 and which project in the opposite directions. The first and second bifurcated portions 82 and 83 have engaging slits 87 and 88, respectively, with which the projections 24 and 42 (see FIGS. 3 and 5) are engaged.

Figure 8:
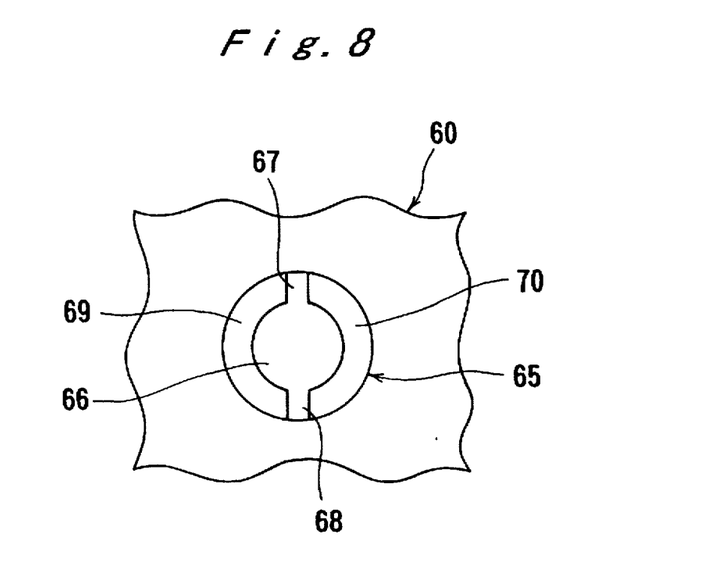
FIG. 8 is a front view showing a pivot portion provided in a support plate, viewed from a portion where the lever is provided.

FIG. 8 shows the pivot portion 65 provided in the support plate 60, viewed from a portion where the lever 80 is provided. As shown in this drawing, the pivot portion 65 has a round hole 66, a pair of notches 67 and 68, and a pair of arculate sliding projections 69 and 70. The diameter of the hole 66 is slightly larger than that of the cylindrical body 84, and the breadths or widths of the notches 67 and 68 are slightly larger than those of the tongue portions 85 and 86.

Figure 9:
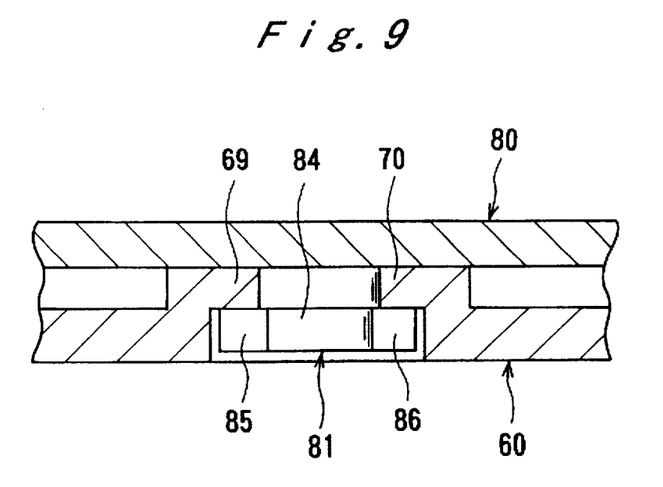
FIG. 9 is an enlarged sectional view showing the pivot pin and pivot portion.
Figure 10:
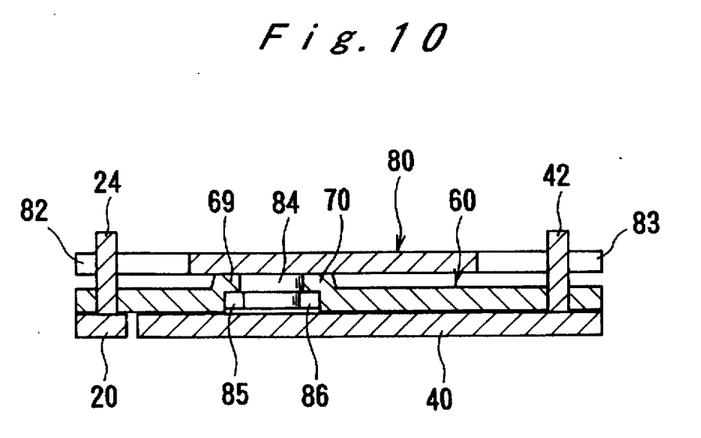
FIG. 10 is a sectional view showing a connecting relationship between the lever and the support plate.

When assembling the lever 80 to the support plate 60, firsts the tongue portions 85 and 86 are fitted in the notches 67 and 68 so that the cylindrical body 84 is inserted into the hole 66. Then, the lever 80 is rotated about the cylindrical body 84 by 90 degrees, for example, and thus, the tongue portions 85 and 86 are engaged with the sliding projections 69 and 70, as shown in FIG. 9. Thus, the lever 80 is provisionally connected to the support plate 60. Then, the projection 24 of the first barrier member 20 is inserted in the engaging slit 87 by elastically expanding the first bifurcated portion 82, and the projection 42 of the second barrier member 40 is inserted in the engaging slit 88 by elastically expanding the second bifurcated portion 83, whereby the assembling operation is completeds as shown in FIG. 10. Thus, when an operation, in which the assembly is connected to the rear surface of the cover portion 13, is carried out, the lever 80 is prevented from falling off.

Figure 11:
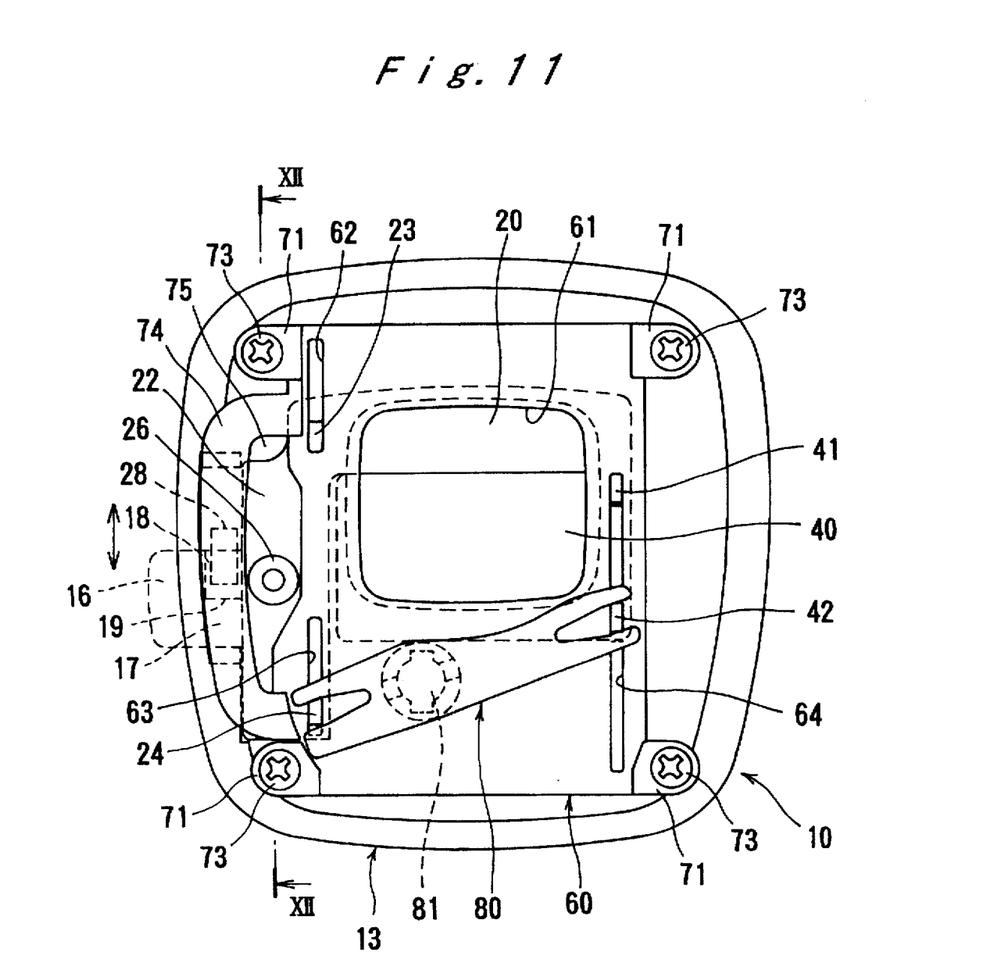
FIG. 11 is a rear view showing the barrier device.
Figure 12:
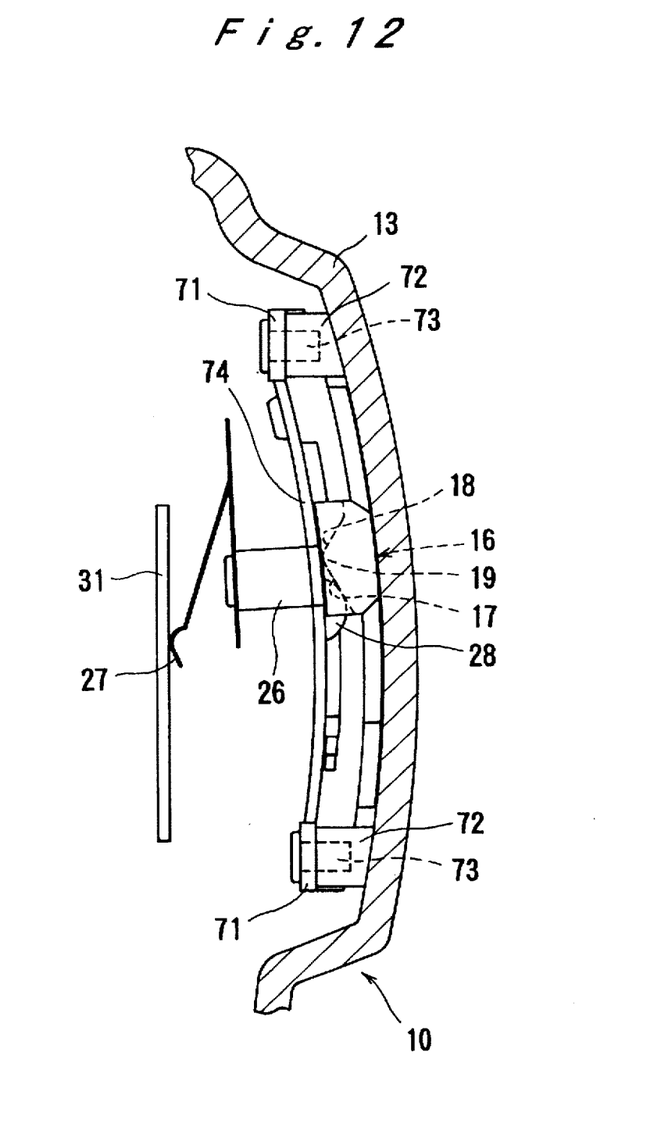
FIG. 12 is a sectional view along line XII—XII of FIG. 11.

FIG. 11 shows the barrier device 10, yielded from the support plate 60, and FIG. 12 is a sectional view, along line XII—XII of FIG. 11. As shown in FIG. 11, flanges 71 are forced at four corners of the support plate 60, and these flanges 71 are fixed by screws 73 to pins 72 formed on a rear surface of the cover portion 13.

A frame 74, is connected to a side portion of the support plate 60 in such a manner that a s lot 75 is formed between the frame 74, and the support plate 60. A switch pin 26 is provided on a rear surface of the first barrier member 20 is positioned in the slot 75 and projects from the frame 74 as shown in FIG. 12. A brush 27 is fixed to a tip portion of the switch pin 26, and is urged to come in slidable contact with a base plate 31 on which an electric power supply circuit (not shown)is formed to control an, electric power source of the camera. The electric power supply circuit is operated in accordance with the position of the brush 27, so that the electric power source is turned ON and OFF.

An operation member 16 is connected to a peripheral portion of the side part 22, and is extended in a lateral direction in FIGS. 3, 5, and 11. The operation member 16 has first and second engaging surfaces 17 and 18 which are provided close to the side part 22 and face the side part 22. The first engaging surface 17 is inclined so that the boundary 19 between the first and second engaging surfaces 17 and 18 is close to the side part 22. The second engaging surface 18 is also inclined so that the boundary 19 is close to the side part 22. On the other hand, a semi-circular protrusion 28 is formed on a front surface of the frame 74 to be able to engage with the first or second engaging surface 17 or 18.

When the operation member 16 is moved upward as shown in FIGS. 1, 3, and 12, the first engaging surface 17 is engaged with the protrusion 28, so that the first and second barrier member 20 and 40 are stably held in a state in which the first and second barrier member 20 and 40 open the openings 12 and 61. In this state, the brush 27 is positioned at a portion of the base plate 31 so that the power switch is turned ON.

Conversely, when the operation member 16 is moved downward as shown in FIGS. 2, 5, and 11, the second engaging surface 18 is engaged with the protrusion 28, so that the first and second barrier member 20 and 40 are stably held in a state in which the first and second barrier member 20 and 40 close the openings 12 and 61. In this state, the brush 27 is positioned at another portion of the base plate 31 so that the power switch is turned OFF. Thus, the operation member 16 is a part of the power switch turning ON and OFF the electric power source.

An operation of the embodiment ,will be described below.

When the camera is not used, the operation member 16 is positioned at the lower position as shown in FIGS. 2, 5, and 11, and thus the first and second barrier members 20 and 40 close the openings 12 and 61. In this state, the second engaging surface 18 of the operation member 16 is engaged with the protrusion 28 so that the first and second barrier members 20 and 40 are stably held in the closed conditions, and the electric power source is turned OFF.

when the camera is used, the operation member 16 is moved upward as shown in FIGS. 1, 3, and 12, the first barrier member 20 is moved upward along the guide slits 62 and 63, and the lever 80 is rotated clockwise about the pivot pin 81 as shown in FIG. 3, so that the second barrier member 40 is moved downward along the guide slit 64. Namely, the first and second barrier members 20 and 40 are opened and displaced outside the openings 12 and 61, and thus the photographing lens 14 is exposed.

The distance from the pivot pin 81 to the projection 42 of the second barrier member 40 is longer than the distance from the pivot pin 81 to the projection 24 of the first barrier member 20, and due to the principles of the lever and fulcrum, the driving force of the lever 80 is transmitted from the first barrier member 20 to the second barrier member 40 in such a manner that the moving amount of the second barrier member 40 driven by the lever 80 is enlarged. Therefore, by a stroke which is large enough for the first barrier member 20 to move to the outside of the openings 12 and 61, the second barrier member 40, the stroke of which is larger than that of the first barrier member 20, is also moved to the outside of the openings 12 and 61. Namely, the first and second barrier members 20 and 40 are opened by moving the operation member 16 by a stroke shorter than that of the second barrier member In the operation in which the operation member 16 is moved upward in the drawings, the first engaging surface 17 moves along the protrusion 28 so that the protrusion 28 climbs the boundary 19 to flex the frame 74, and the protrusion 28 is engaged with the second engaging surface 18. Thus, the first and second barrier members 20 and 40 are stably held in the open condition, and the electric power source is turned ON.

Then, when the operation member 16 is moved downward as shown in FIGS. 2, 5, and 11, the first barrier member 20 is moved downward along the guide slits 62 and 63, and the lever 80 is rotated counterclockwise about the pivot pin 81 as shown in FIG. 5, so that the second barrier member 40 is moved upward along the guide slit 64. Namely, the first and second barrier members 20 and 40 are closed, and thus the photographing lens 14 is covered by the first and second barrier members 20 and 40.

Similar to the opening operation described above, since the moving amount of the first barrier member 20 driven by the lever 80 is enlarged due to the principles of the lever and fulcrums the first and second barrier members 20 and 40 are opened by moving the operation member 16 by a stroke shorter than that of the second barrier member 40. In the closing operation in which the operation member 16 is moved downward in the drawings, the protrusion 28 is moved along the second engaging surface 18 climbs the boundary 19 to flex the frame 74, and is engaged with the second engaging surface 17. Thus, the first and second barrier, members 20 and 40 are stably held in the closed condition, and the electric power source is turned OFF.

Thus, in the opening and closing operations in which the operation member 16 is operated, the operator should press the operation member 16 by a force larger than a predetermined amount so that the protrusion 28 goes over the projected boundary 19. Therefore, the operator can feel a click movement of the operation member 16, and thus recognize whether the barriers 20 and 40 are set in the opening or closing position.

As described above, according to the embodiment, by a stroke shorter than a half of the length along the direction in which the first and second barrier members 20 and 40 are moved, the openings 12 and 61 are opened and closed. Therefore a large space is not needed at one side of the openings 12 and 61 so that the first and second barrier members 20 and 40 are displaced outside the openings 12 and 61, and thus, the barrier device 10 is simple and the stroke of the operation member 16 does not have to be long to open and close the openings 12 and 61. Further, the slot 15 formed in a side surface of the cover portion 13 can be made small.

In the embodiment, since the operation, member 16 has first and second engaging surfaces 17 and 18 which are engaged with the protrusion 28 of the first barrier member 20 when the first and second barrier members 20 and 40 are moved, the opening and closing operations are positively carried out and the open and closed conditions are held stably.

Further, in the embodiment, the first and second barrier members 20 and 40 have stepped edges 25 and 43 which are engaged with each other to close the openings 12 and 61. Therefore, in the closing condition, the openings 12 and 61 are tightly closed so that dust cannot easily enter the openings 12 and 61.

Still further, since the operation member 16 operates as an operation lever for opening and closing the openings 12 and 61, and as a power switch for turning the electric power of the camera ON and OFF. Accordingly, the operation of the barrier device is simple.

Since, when assembling the barrier device 10, the lever 80 can be provisionally attached to the support plate 60, the lever 60 does not become detached from the barrier device 10. Therefore, the assembling operation is easy.

Note that the material of which the various components of the barrier device 10 are made may be plastic material, such as synthetic resin, and is not restricted to any particular material. However, the elasticity of the various components of the barrier device 10 including the lever 80 and frame 74, should be suitably selected so that the functions described above may be performed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 6-336561 (filed on Dec. 22, 1994) which is expressly incorporated herein, by reference, in its entirety.

I claim:

1. A barrier device for a camera having a photographing lens, comprising:

a cover plate having a first opening through which said photographing lens is selectively exposed;

a support plate having a second opening positioned coincident with said first opening so that said photographing lens is selectively exposed through said second opening;

a first barrier member disposed between said cover plate and said support plate, said first barrier member being movable to cover a first part of said first opening;

a second barrier member disposed between said cover plate and said support plate, said second barrier member being movable to cover a second part of said first opening, said second part not being covered by said first barrier member, such that said second part covers more than half of said first opening;

an operation member connected to said first barrier member that moves said first barrier member; and a lever rotatably supported by a rear surface of said support plate, said rear surface of said support plate being positioned opposite to said cover plate, said lever connecting said first barrier member and said second barrier member so that a movement of said first barrier member is transmitted to said second barrier member in such a manner that a moving amount of said second barrier member is greater than a moving amount of said first barrier member.

2. The barrier device of claim 1, wherein said lever moves said first barrier member and said second barrier member parallel to a pair of vertical boundaries, said lever having a pivoting point around which said lever is rotated, said lever being disposed within a region of said pair of vertical boundaries.

3. The barrier device of claim 2, wherein said pivoting point of said lever is disposed within a range in which said second barrier member can be moved to cover said second part of said first opening.

4. The barrier device of claim 1, wherein said first barrier member has a first barrier portion covering said first part, said second barrier member has a second barrier portion covering said second part, said second barrier portion being larger than said first barrier portion.

5. The barrier device of claim 1, wherein each of said first barrier member and said second barrier member are formed to be coincident with a curvature of a cylindrical plate and are moved along a cylindrical plane corresponding to said cylindrical plate.

6. The barrier device of claim 1, wherein said support plate has a plurality of vertical slits, said first barrier member and said second barrier member having projections slidably supported by said plurality of vertical slits.

7. The barrier device of claim 1, wherein said cover plate protrudes and has a slot formed in a side surface thereof, said operation member projecting from said slot.

8. The barrier device of claim 1, wherein said first barrier member has a first stepped edge, and said second barrier member has a second stepped edge, said first stepped edge and said second stepped edge engaging with each other to close said first opening.

9. The barrier device of claim 1, wherein said lever is supported by a pivot portion, a first end portion of said lever being connected to said first barrier member, and a second end portion of said lever being connected to said second barrier member.

10. The barrier device of claim 9, wherein a distance between said pivot portion and said first end portion is shorter than a distance between said pivot portion and said second end portion.

11. The barrier device of claim 9, wherein said first end portion comprises a first fork and said second end portion comprises a second fork, a portion of said first barrier member being inserted in said first fork by elastically expanding said first fork, a part of said second barrier member being inserted in said second fork by elastically expanding said second fork.

12. The barrier device of claim 1, further comprising a holding mechanism that holds said first barrier member and said second barrier member in a state in which said first barrier member and said second barrier member open and close said first opening.

13. The barrier device of claim 1, further comprising a generating mechanism that generates a force greater than a predetermined amount so that said first barrier member and said second barrier member selectively open and close said first opening.

14. The barrier device of claim 1, wherein said operation member comprises a part of a power switch for selectively turning ON and OFF an electric power source of said camera.

* * * * *